T. H. KILLAM.
HOE.
APPLICATION FILED FEB. 6, 1920.
1,372,298.
Patented Mar. 22, 1921.
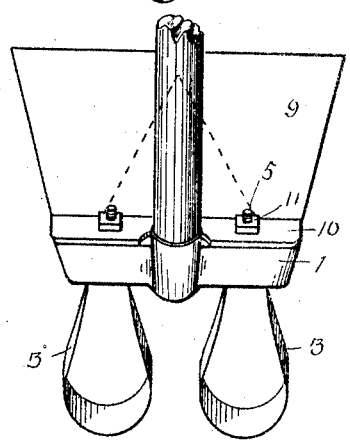
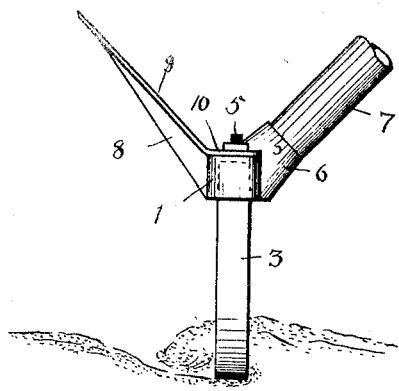
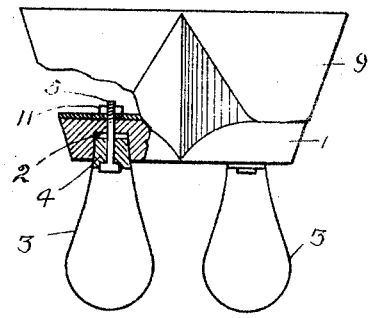
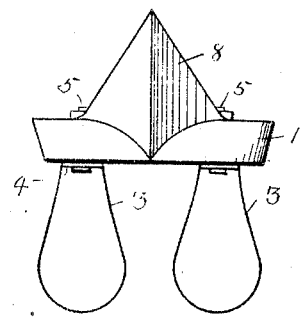
INVENTOR
Thos H Killam
BY
Geo Strans
ATTORNEY

UNITED STATES PATENT OFFICE.

THOMAS H. KILLAM, OF DULUTH, MINNESOTA.

HOE.

1,372,298.  Specification of Letters Patent.  Patented Mar. 22, 1921.

Application filed February 6, 1920. Serial No. 356,635.

*To all whom it may concern:*

Be it known that I, THOMAS H. KILLAM, a citizen of the United States, residing at Duluth, in the county of St. Louis and State of Minnesota, have invented certain new and useful Improvements in Hoes, of which the following is a specification, reference being had therein to the accompanying drawing.

This invention relates to soil cultivating devices and has special reference to a novel form of hoe to be used by hand.

The principal object of the invention is to provide a tool of this character which is an improvement over what is already known in the art both in the character of work performed and the general adaptability and convenience of the instrument.

Another object is to produce such a tool more convenient in operating about small plants than the common hoe, and one which may be drawn through the soil in culling weeds and displacing as little of the former as possible.

Other objects and advantages of the peculiar construction will appear as the description of the invention proceeds.

In the accompanying drawings forming part of this application:

Figure 1 is an elevation of the hoe taken axially of the handle from the operator's viewpoint.

Fig. 2 is a side elevation of the hoe.

Fig. 3 is a broken front elevation, and

Fig. 4 is a view similar to Fig. 3 except that it is unbroken and that one portion thereof is removed.

1 represents the body portion of the hoe which is preferably formed of metal and is substantially rectangular in cross section, and within the lower face of which are formed two spaced rectangularly shaped holes 2 for the reception of the free ends of the spring steel soil engaging loops 3. A rectangularly shaped plug 4 is provided for each hole 2 and designed to be drawn tightly therein by a suitable through bolt 5 after the ends of the loops 3 are placed into the holes, thus securely wedging same therein, as the walls of the holes engaged by the ends of the loops converge slightly inwardly and the plugs 4 are similarly inclined.

The soil engaging loops 3 are made of spring steel such as clock springs are made of and being very hard are found to wear well and may be quickly and easily removed or renewed by the mechanism above described.

Upon one upper corner of the body portion 1 is integrally formed a handle socket 6 into which any form of suitable handle 7 may be mounted and secured in any desired manner. Upon the opposite corner of the body portion and integral therewith is a V-shaped projection 8 extending approximately at a 45 degree angle to said body portion. This projection has a double office in that it may be used as a marker when the hoe is employed in the state shown in Fig. 4, while when the flat soil engaging blade 9 is used it acts as a central brace or support for said blade, the application of the latter being shown in the other figures of the drawings.

The blade 9 has a bent portion 10 which fits snugly upon the upper face of the body portion 1 and is held there by the nuts 11 on the through bolts 5.

While in the preferred form of this hoe the entire device will be constructed of metal it may be said that I have made and used such a hoe with remarkable satisfaction the body portion of which was made of wood and was not provided with the member 8 or auxiliary blade 9, and those wishing to make for their own use such a hoe after the expiration of the monopoly granted in the patenting of this invention may find the same to give admirable satisfaction, and considerable departure may be resorted to from the construction here shown without departing from the spirit of the invention, which is set forth in the following claim:

The combination with a hoe of the character described comprising a body portion having a handle attached thereto and independently removable soil cultivating blades extending from substantially opposite sides of the body portion, of through bolts within the body portion and upon opposite sides of the handle securely holding the blades on both sides of the body portion, and a reinforcing V-shaped member formed integral with the body portion and engaging one of the blades, substantially as described.

In testimony whereof I hereunto affix my signature in the presence of two witnesses.

THOMAS H. KILLAM.

Witnesses:
ELLEN A. THEORIN,
S. GEO. STEVENS.